(12) United States Patent
Zhang et al.

(10) Patent No.: US 11,651,293 B2
(45) Date of Patent: May 16, 2023

(54) HIERARCHICAL DECENTRALIZED DISTRIBUTED DEEP LEARNING TRAINING

(71) Applicant: International Business Machines Corporation, Armonk, NY (US)

(72) Inventors: Wei Zhang, Elmsford, NY (US); Xiaodong Cui, Chappaqua, NY (US); Abdullah Kayi, Westchester, NY (US); Alper Buyuktosunoglu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 16/935,246

(22) Filed: Jul. 22, 2020

(65) Prior Publication Data

US 2022/0027796 A1  Jan. 27, 2022

(51) Int. Cl.
*G06N 20/20* (2019.01)
*H04L 29/08* (2006.01)
*H04L 67/10* (2022.01)

(52) U.S. Cl.
CPC .......... *G06N 20/20* (2019.01); *H04L 67/10* (2013.01)

(58) Field of Classification Search
CPC .......... G06N 20/20; G06N 3/08; H04L 67/10; H04L 67/1095
See application file for complete search history.

(56) References Cited

U.S. PATENT DOCUMENTS

| | | | |
|---|---|---|---|
| 9,633,315 B2 | 4/2017 | Chapelle et al. | |
| 9,984,337 B2 | 5/2018 | Kadav et al. | |
| 10,540,608 B1 | 1/2020 | Dirac et al. | |
| 10,614,360 B2 | 4/2020 | Walters et al. | |
| 2015/0324690 A1 | 11/2015 | Chilimbi et al. | |
| 2018/0307984 A1 | 10/2018 | Koker et al. | |
| 2018/0314971 A1 | 11/2018 | Chen et al. | |
| 2019/0318240 A1 | 10/2019 | Kulkarni et al. | |
| 2019/0332955 A1* | 10/2019 | Manamohan | G06K 9/6256 |
| 2019/0378016 A1* | 12/2019 | John | G06N 3/04 |
| 2019/0385087 A1 | 12/2019 | Martin-Maroto | |
| 2020/0175370 A1* | 6/2020 | Zhang | G06N 20/00 |
| 2020/0175422 A1* | 6/2020 | Zhang | G06N 7/08 |
| 2021/0133577 A1* | 5/2021 | Srinivasan | G06N 3/063 |
| 2021/0287080 A1* | 9/2021 | Moloney | G06V 10/95 |

(Continued)

OTHER PUBLICATIONS

Lian et al., "Asynchronous decentralized parallel stochastic gradient descent", Sep. 26, 2018, 32 pages.

(Continued)

*Primary Examiner* — Abdullahi E Salad
(74) *Attorney, Agent, or Firm* — Donald J. O'Brien

(57) ABSTRACT

Embodiments of a method are disclosed. The method includes performing a batch of decentralized deep learning training for a machine learning model in coordination with multiple local homogenous learners on a deep learning training compute node, and in coordination with multiple super learners on corresponding deep learning training compute nodes. The method also includes exchanging communications with the super learners in accordance with an asynchronous decentralized parallel stochastic gradient descent (ADPSGD) protocol. The communications are associated with the batch of deep learning training.

20 Claims, 5 Drawing Sheets

(56) References Cited

U.S. PATENT DOCUMENTS

2021/0342749 A1* 11/2021 Wang .................... G06N 20/20

OTHER PUBLICATIONS

Zhang et al., "Distributed Deep Learning Strategies For Automatic Speech Recognition", Apr. 10, 2019, 5 pages.
Gupta et al.,, "Model Accuracy and Runtime Tradeoff in Distributed Deep Learning: A Systematic Study", Dec. 5, 2016, 10 pages.
Zhang et al., "A Highly Efficient Distributed Deep Learning System For Automatic Speech Recognition", Jul. 10, 2019, 5 pages.

* cited by examiner

HIERARCHICAL DECENTRALIZED DISTRIBUTED DEEP LEARNING TRAINING

BACKGROUND

The present disclosure relates to decentralized distributed deep learning training, and more specifically, to hierarchical decentralized distributed deep learning training.

Deep learning training is a technological field that represents a subset of machine learning. Machine learning involves teaching a computer algorithm, i.e., the machine, to label a data record in some way, e.g., labelling the subject of a photograph as animate or inanimate. Machine learning involves training the computer algorithm to make the classification by providing labeled examples, e.g., picture subjects labeled as animate or not. In machine learning training, a classification task is performed repeatedly in order to gradually improve the accuracy of the classification. Deep learning training involves making these same classifications but can use neural networks, which mimic learning in the human brain. Such learning is possible due to multiple layers of computational logic that enable progressive learning, i.e., enable the machine to get better at the classification.

SUMMARY

Embodiments of a method are disclosed. The method includes performing a batch of decentralized deep learning training for a machine learning model in coordination with multiple local homogenous learners on a deep learning training compute node, and in coordination with multiple super learners on corresponding deep learning training compute nodes. The method also includes exchanging communications with the super learners in accordance with an asynchronous decentralized parallel stochastic gradient descent (ADPSGD) protocol. The communications are associated with the batch of deep learning training.

Embodiments of a hierarchical system are disclosed. The hierarchical system includes multiple homogenous learners at a child level of the hierarchical system. Each of the super learners is a parent to an associated subset of the homogenous learners. Further, respective super learners are associated with respective subsets of the local homogenous learners. Additionally, each of the super learners includes a computer processing circuit and a computer-readable storage medium storing instructions. When executed by the computer processing circuit, the instructions are configured to cause the computer processing circuit to perform a method. The method includes performing a batch of deep learning training for a machine learning model in coordination with the associated subset of the local homogenous learners on a deep learning training compute node, and in coordination with the super learners on corresponding deep learning training compute nodes. The method also includes exchanging communications with the super learners in accordance with an asynchronous decentralized parallel stochastic gradient descent (ADPSGD) protocol. The communications are associated with the batch of deep learning training.

Further aspects of the present disclosure are directed toward systems and computer program products with functionality similar to the functionality discussed above regarding the computer-implemented methods. The present summary is not intended to illustrate each aspect of every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1:
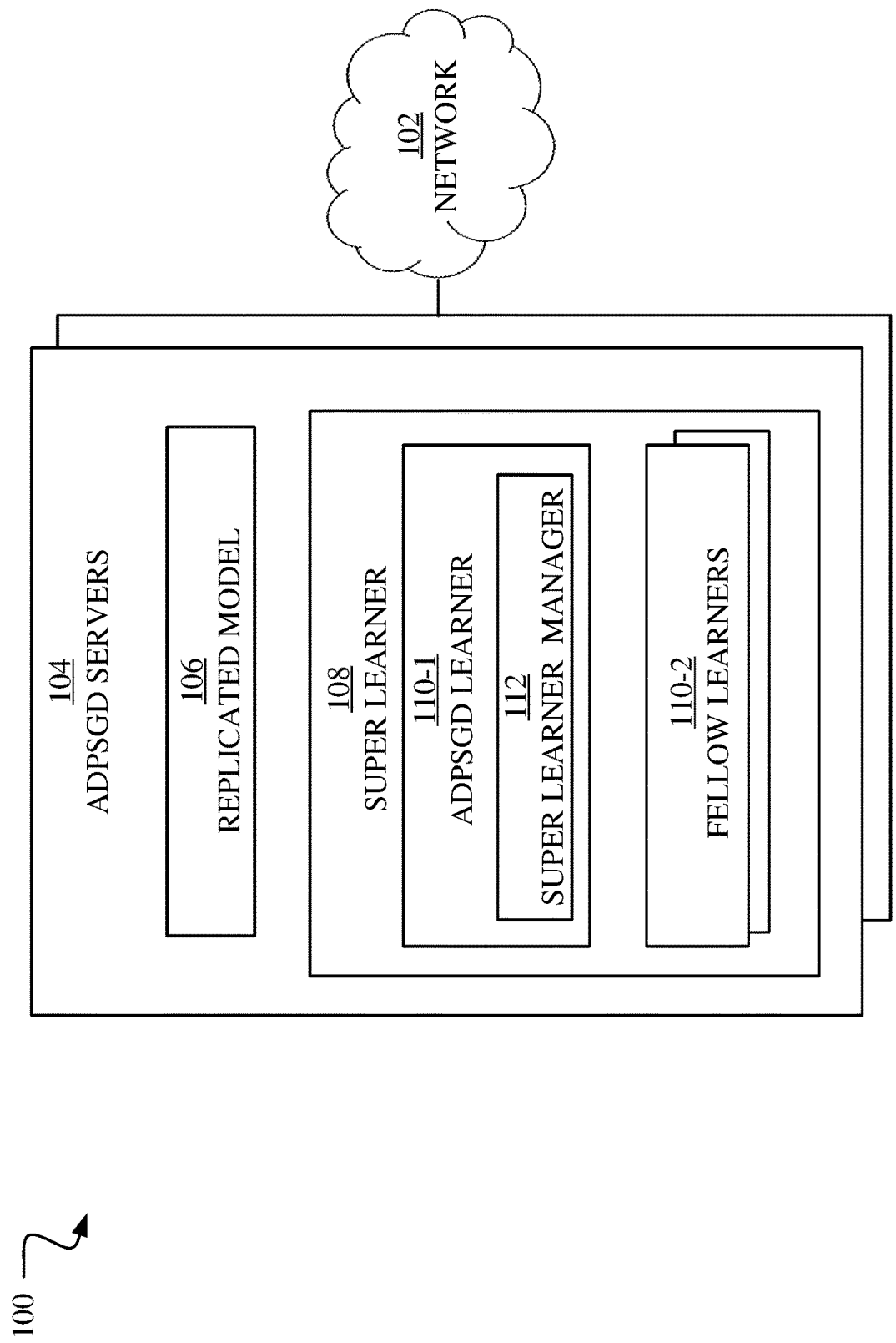
FIG. 1 is a block diagram of an example system for hierarchical ADPSGD, in accordance with some embodiments of the present disclosure.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Machine learning is a process wherein a computer algorithm is trained to make a specific classification. For example, machine learning algorithms (learners) can be trained to identify classes of objects in a digital photograph, predict a future shopping choice of a potential customer in a marketing database, and so on. However, training learners can be computationally expensive. In other words, training can involve relatively large numbers of computational decision-making and/or input-output (I/O) requests. As such, training can take a relatively large amount of time, which may violate constraints on the relevance of the trained classification and/or financial budgets. For example, a future sale may be scheduled for a holiday weekend. Accordingly, training a machine learning algorithm to predict future shopping choices may not be relevant once the holiday weekend has passed. Thus, using distributed deep learning training, it is possible to reduce the amount of time involved in training.

Distributed deep learning training refers to a computational architecture that performs these layers of computational logic in parallel by using multiple compute nodes to perform different parts of the classification problem. In this way, distributed deep learning training can reduce the amount of time to train and improve the speed with which deep learning training systems learn.

Distributed deep learning training can involve either a central or decentralized control. The centralized control can include a central parameter server that distributes training data to the learners, determines and adjusts training parameters, coordinates the processing of training data, and the like. In a decentralized control, the learners can distribute training data to other learners, determine and adjust training parameters, and the like. These controls can be synchronous or asynchronous. Synchronous control means that the training of the multiple learners is concurrent, or processed within an overlapping time period. Asynchronous control means that the training time periods may not overlap.

For example, in synchronous centralized deep learning training, all learners talk to the parameter server for each iteration of batch training in a lock-step fashion. In contrast, in asynchronous decentralized parallel stochastic gradient descent (ADPSGD) training, the learners communicate in a peer-to-peer fashion. For example, learners 0 through 3 may communicate as follows: in one iteration, learners 0 and 3, and learners 1 and 2 communicate with each other. In the next iteration, learner 0 and 1 and learners 2 and 3 communicate with each other. They may merely exchange and average weights. There is no global synchronization and the system works in a decentralized and asynchronous manner.

In machine learning, an asynchronous decentralized distributed deep learning training approach can be useful for finding solutions to classifications and convergence. Asynchronous decentralized distributed training has thus become a useful training strategy when dealing with large-scale volumes of training data because this strategy can remove the communication bottleneck caused by a centralized parameter server in centralized distributed deep learning training. Further, the asynchronous decentralized strategy has shown strong scaling-out performance in various tasks and can work with larger batch sizes than in synchronous centralized strategies. However, when there are large number of learners, asynchronous decentralized distributed training convergence can decay. Decaying in this context means that the learners are no longer converging towards the same model. As such, as the number of learners increases, it becomes more challenging for asynchronous decentralized distributed deep learning training learners to converge to a specific model.

Accordingly, some embodiments of the present disclosure can provide a hierarchical system to improve the decentralized distributed deep learning training efficiency, both in terms of model accuracy and system runtime. In this way, some embodiments of the present disclosure can improve the convergence rate to consensus in comparison to current decentralized deep learning training approaches and incur a comparatively lower communication cost.

FIG. 1 is a block diagram of an example system 100 for hierarchical ADPSGD, in accordance with some embodiments of the present disclosure. The system 100 includes a network 102 and multiple ADPSGD servers 104.

The network 102 may include one or more computer communication networks. An example network 102 can include the Internet, a local area network (LAN), a wide area network (WAN), a wireless network such as a wireless LAN (WLAN), or the like. Network 102 may comprise copper transmission cables, optical transmission fibers, wireless transmission, routers, firewalls, switches, gateway computers and/or edge servers. A network adapter card or network interface in each computing/processing device implemented as part of the ADPSGD servers 104, for example, may receive messages and/or instructions from and/or through network 102, and forward the messages and/or instructions for storage or execution (or the like) to a respective memory or processor of the respective computing/processing device. Though network 102 is depicted as a single entity in FIG. 1 for purposes of illustration, in other examples network 102 may include a plurality of private and/or public networks over which the components of the system 100 may communicate.

The ADPSGD servers 104 can be computing systems including rack servers, blade servers, and the like The ADPSGD servers 104 can host a replicated model 106 and a super learner 108.

The replicated model 106 can be a machine learning model that the super learner 108 is collectively training with other super learners across an ADPSGD ring to make classifications. In an ADPSGD ring, the replicated model 106 can be replicated across ADPSGD servers, such as the ADPSGD servers 104. In this way, each of the super learners 108 can train the same machine learning model.

In some embodiments, the super learner 108 includes a set of homogenous learners that include an ADPSGD learner 110-1 and multiple fellow learners 110-2 (referred to herein collectively as learners 110). Homogenous learners can be learners that share the same hardware architecture and specification so that they behave similarly to each other during program runs. For example, homogenous learners may be learners 110 that run on the same node with homogeneous compute elements. More specifically, the ADPSGD server 104 can include multiple graphics processing units (GPUs), and all those GPUs (or in a broader sense, compute elements) are homogeneous in terms of compute capability.

Additionally, the ADPSGD learners 110-1 and fellow learners 110-2 are associated in a parent-child relationship, wherein one ADPSGD learner 110-1 can be a parent to multiple children, i.e., fellow learners 110-2. Based on this association, the ADPSGD learner 110-1 and fellow learners 110-2 collectively perform the stochastic gradient descent work of model convergence, as one typical learner in an ADPSGD ring.

Further, the super learners 108 can train the replicated models 106 using training data. Training data can include batches of records that the super learners 108 attempt to classify. Additionally, the training data can include labels that indicate the correct classifications. In this way, the super learners 108 can determine when their classifications are correct and try to learn, i.e., improve the classification. Accordingly, the super learners 108 can adjust specific parameters used to make the classifications based on whether classifications are correct. These parameters are also referred to herein as weights and gradients.

Additionally, the ADPSGD learner 110-1 includes a super learner manager 112. The super learner manager can perform the ADPSGD communications with other super learners 108 across an ADPSGD ring. Additionally, the super learner manager 112 can manage the communication between the learners 110.

In some embodiments, the super learner manager 112 can use quantization, e.g., compression of the communication traffic with the other super learners to improve training speed in the system 100. Additionally, the learners 110 can randomize their communication pattern with each other instead of a fixed pattern, e.g., "just talk to the adjacent neighbors." Further, the learners 110 can use a coarser communication frequency than the typical every-iteration pattern. For example, the learners 110 can communicate every other iteration, every third iteration, at random iterations, and the like.

In this way, a system 100 with hierarchical ADPSGD can provide advantages over current ADPSGD systems in model accuracy and system runtime. More specifically, the super learner 108 can improve model accuracy by consolidating multiple learners 110 on one ADPSGD server 104. Accordingly, the effective number of learners can remain relatively small in the ADPSGD ring, which improves convergence.

With regard to system runtime, the learners 110 on the same ADPSGD server 104 may be homogeneous and the bandwidth between the learners 110 may thus be greater than the bandwidth between ADPSGD servers 104. As such, the super learner 108 can provide reduced network bandwidth compared to current systems, thus reducing system runtime by reducing potential communication bottlenecks.

Figure 2:
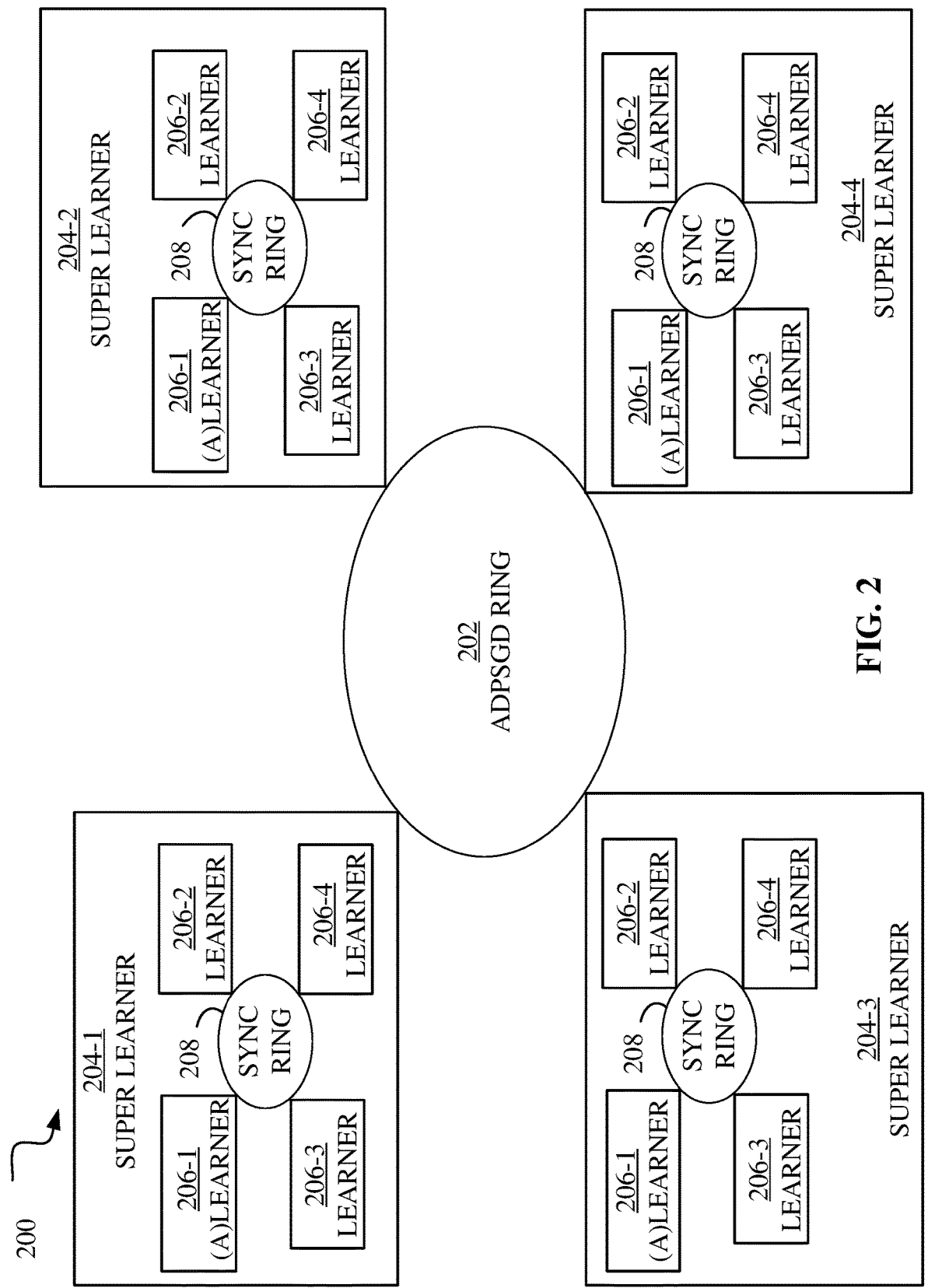
FIG. 2 is a block diagram of an example system for hierarchical ADPSGD, in accordance with some embodiments of the present disclosure.

FIG. 2 is a block diagram of an example system 200 for hierarchical ADPSGD, in accordance with some embodiments of the present disclosure. The system 200 includes an ADPSGD ring 202 and super learners 204-1 through 204-4 (referred to herein collectively as super learners 204). The ADPSGD ring 202 can represent an all reduce ring for communication between the super learners 204. The all reduce ring may be useful for communication between the super learners 204 using the ADPSGD protocol. The super learners 204 can be similar to the super learners 108 described with respect to FIG. 1.

Referring back to FIG. 2, the super learners 204 can include ADPSGD (A) learner 206-1 and learners 206-2 through 206-4 (referred to herein collectively as learners 206) and SYNC ring 208. The ADPSGD learner 206-1 can be similar to the ADPSGD learner 110-1. The learners 206-2 through 206-4 can be similar to the fellow learners 110-2.

The SYNC ring 208 can represent a synchronous stochastic gradient descent (SGD) communication protocol between the learners 206. This communication may be synchronous to facilitate the learners 206 working collectively as one effective learner in the ADPSGD ring 202.

In some embodiments of the present disclosure, ADPSGD systems can converge with a batch size over 10,000 for a SWB2000 dataset. Thus, to take advantage of the ability of ADPSGD to handle larger batch sizes, the hierarchical ADPSGD system 200 can include multiple super learners 204, with multiple learners 206 performing SGD, and each super learner 204 participating as one effective learner in the ADPSGD ring 202.

Figure 3:
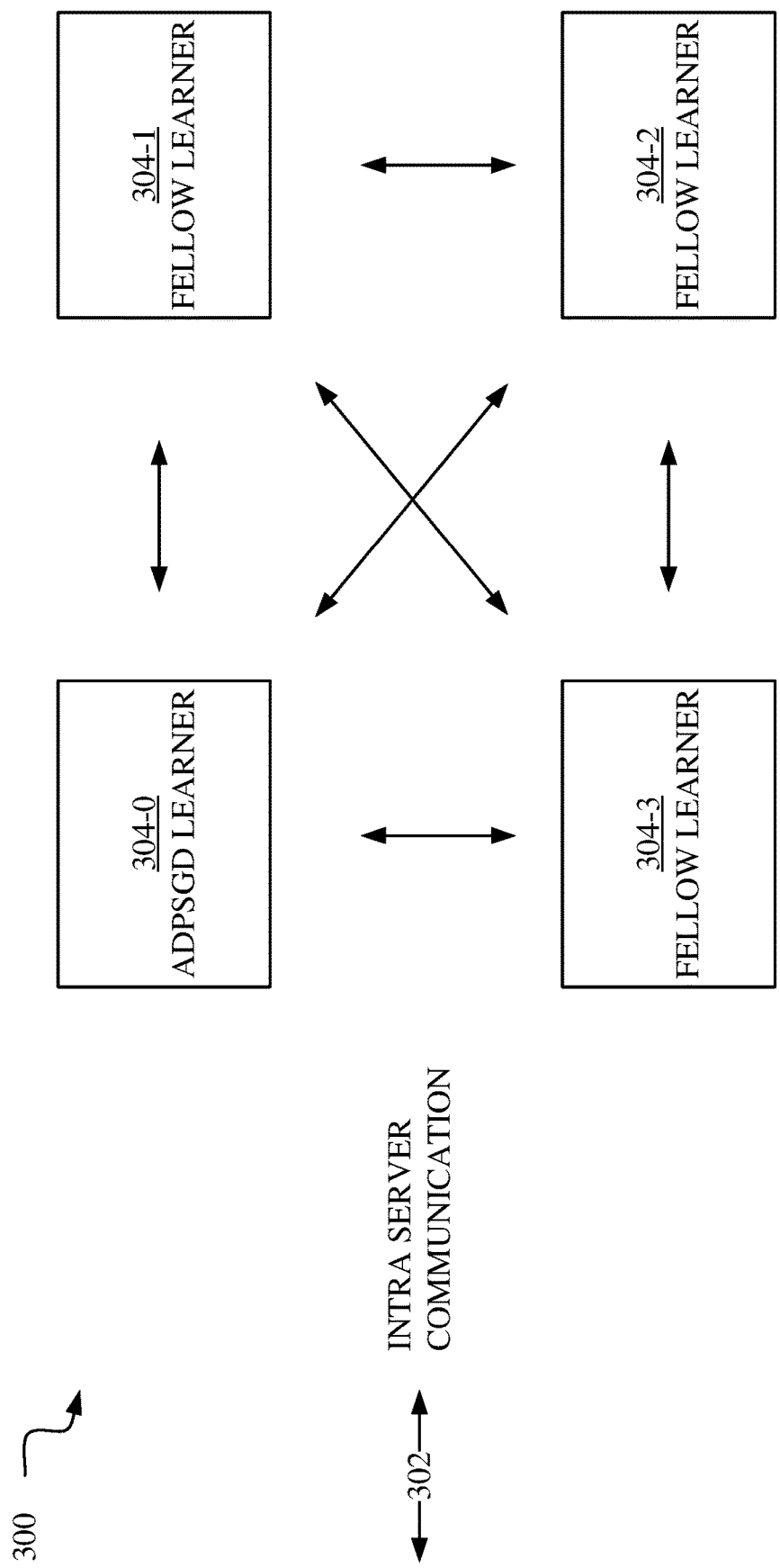
FIG. 3 is a SYNC ring, in accordance with some embodiments of the present disclosure.

FIG. 3 is a SYNC ring 300, in accordance with some embodiments of the present disclosure. The SYNC ring 300 includes intra-server communications 302, ADPSGD learner 304-0, and fellow learners 304-1 through 304-3 (referred to herein collectively as learners 304). The intra-server communications 302 represent the synchronous SGD communications between multiple homogenous learners on the same server, i.e., compute node. The ADPSGD learner 304-0 can be similar to the ADPSGD learner 110-1, and the fellow learners 304-1 through 304-3 can be similar to the fellow learners 110-2.

As stated previously, the learners 304 can perform synchronous SGD so that, collectively, the learners 304 can act as one effective learner in an ADPSGD ring. Typically, in a synchronous SGD ring, the learners can communicate in a static pattern, whereby the learners only communicate with neighboring learners, after each iteration of batch processing. However, in some embodiments of the present disclosure, any one of the learners 304 can communicate with any other of the learners 304. Accordingly, the communications 302 represent the ability of all the learners 304 to communicate with any other of the learners 304. Further, the learners 304 can perform the communications 302 in random iterations. Thus, the learners 304 may perform the communications 302 after one iteration, then after 3 iterations, then after 2 iterations, and the like. By randomizing when the learners 304 perform the communications, the SYNC ring 300 may prevent communication bottlenecks on a single ADPSGD server, such as the ADPSGD server 104.

Figure 4:
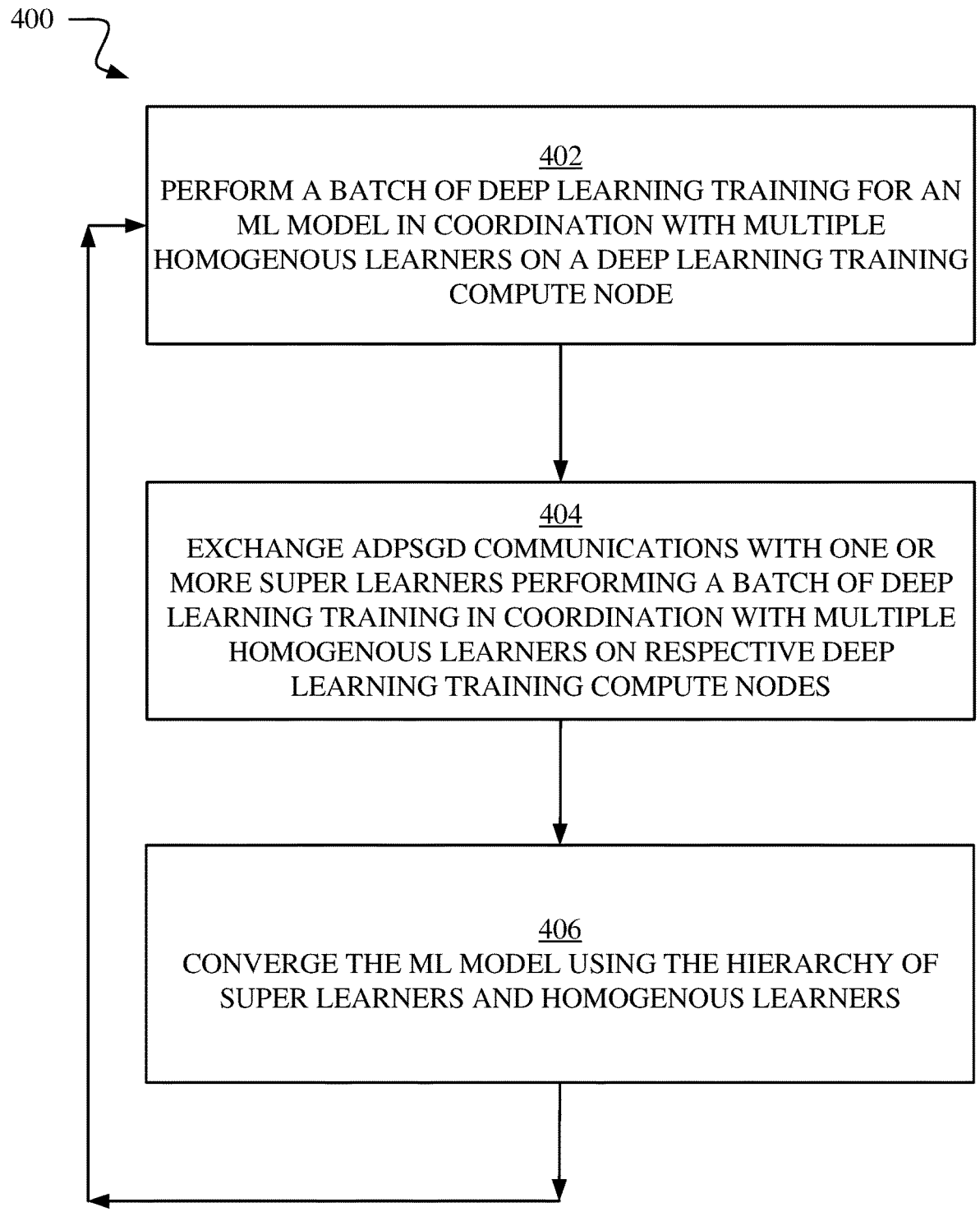
FIG. 4 is a process flow diagram of a method for hierarchical ADPSGD, in accordance with some embodiments of the present disclosure.

FIG. 4 is a process flow diagram of a method 400 for hierarchical ADPSGD, in accordance with some embodiments of the present disclosure. In some embodiments of the present disclosure, learners and a super learner manager, such as, the learners 110 and the super learner manager 112, described with respect to FIG. 1, may perform the method 400.

Referring back to FIG. 4, at operation 402, the learners 110 can perform one or more batches of deep learning training for a machine learning (ML) model in coordination with multiple homogenous learners on a deep learning training compute node. As stated previously, multiple homogenous learners, such as the learners 110, can perform deep learning training on one ADPSGD server 104 using a SYNC ring. The SYNC ring enables the learners 110 to work collectively as one super learner, such as the super learner 108. As stated previously, multiple super learners 108 can work in coordination across an ADPSGD ring, such as the ADPSGD ring 202 described with respect to FIG. 2. As such, the learners 110 on each of the super learners 108 working in coordination perform the same number of iterations. Typically, the super learner manager 112 performs the ADPSGD communication with the other super learners 108 after one iteration of a batch of deep learning training. However, in some embodiments of the present disclosure, the learners 110 may perform a random number of iterations before the super learner manager 112 performs the ADPSGD communications.

At operation 404, the super learner manager 112 can exchange ADPSGD communications with one or more super learners 108 performing deep learning training in coordination with multiple homogenous learners on respective deep learning training compute nodes. By exchanging the ADPSGD communications at the super learner level, a hierarchical ADPSGD system, such as the hierarchical ADPSGD system 100 can combine the work of multiple learners into the work of one participant, the super learner 108.

At operation 406, the hierarchical ADPSGD system 100 can converge the ML model using the hierarchy of super learners 108 and homogenous learners. As stated previously, the hierarchical ADPSGD system 100 can converge machine learning models using large batch sizes. Thus, by incorporating learners into a hierarchy of homogenous learners running on one compute node and super learners communicating across an ADPSGD ring, the hierarchical ADPSGD system 100 can take advantage of this ability without the risk of convergence decay.

Figure 5:
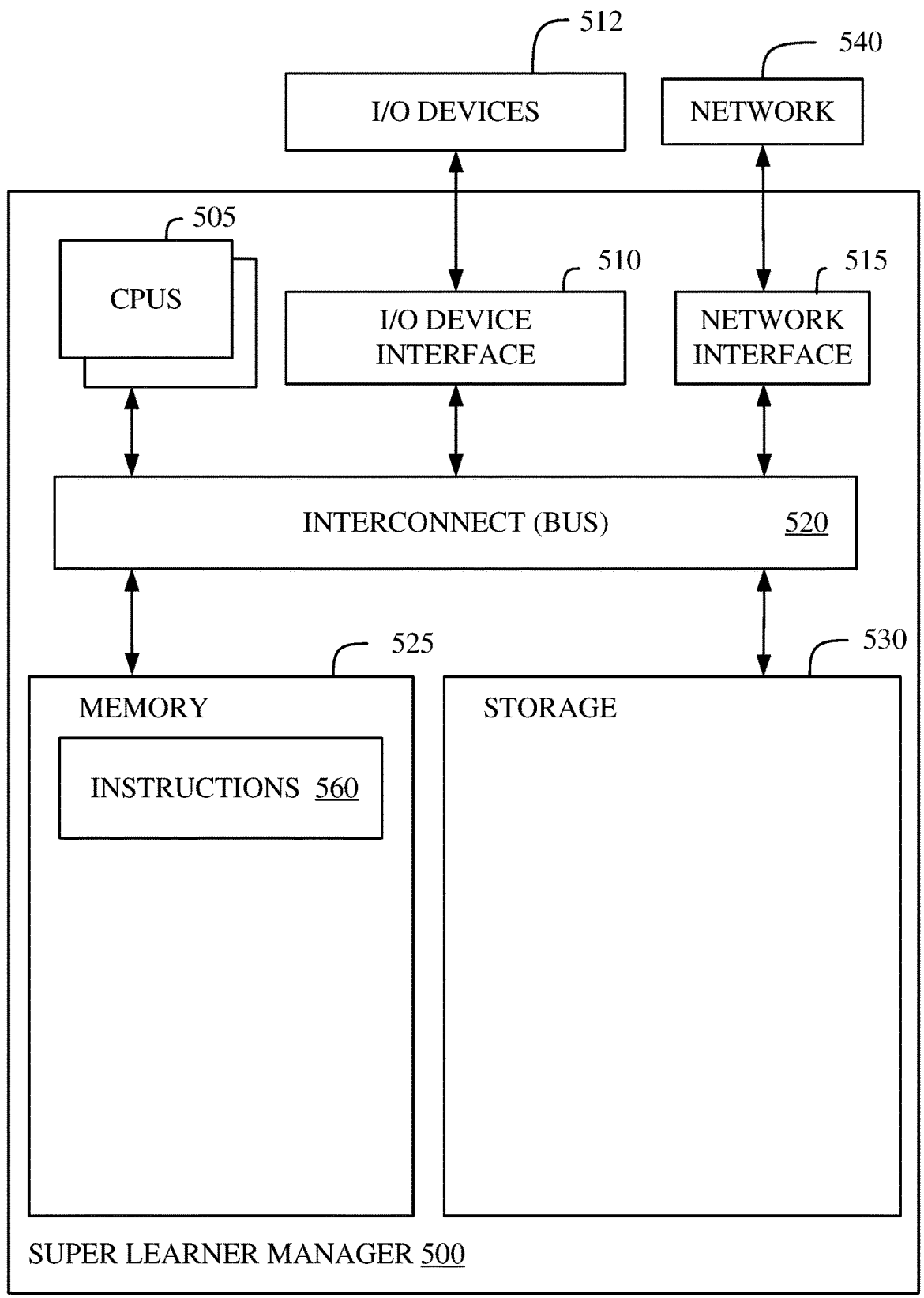
FIG. 5 is a block diagram of an example super learner manager, in accordance with some embodiments of the present disclosure.

FIG. 5 is a block diagram of an example super learner manager 500, in accordance with some embodiments of the present disclosure. In various embodiments, the super learner manager 500 is similar to the super learner manager 112 and can perform the method described in FIG. 4, and/or the functionality discussed in FIGS. 1-3. In some embodiments, the super learner manager 500 provides instructions for the aforementioned methods and/or functionalities to a client machine such that the client machine executes the method, or a portion of the method, based on the instructions provided by the super learner manager 500. In some embodiments, the super learner manager 500 comprises software executing on hardware incorporated into a plurality of devices.

The super learner manager 500 includes a memory 525, storage 530, an interconnect (e.g., BUS) 520, one or more CPUs 505 (also referred to as processors 505 herein), an I/O device interface 510, I/O devices 512, and a network interface 515.

Each CPU 505 retrieves and executes programming instructions stored in the memory 525 or the storage 530. The interconnect 520 is used to move data, such as programming instructions, between the CPUs 505, I/O device interface 510, storage 530, network interface 515, and memory 525. The interconnect 520 can be implemented using one or more busses. The CPUs 505 can be a single CPU, multiple CPUs, or a single CPU having multiple processing cores in various embodiments. In some embodiments, a CPU 505 can be a digital signal processor (DSP). In some embodiments, CPU 505 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 525 is generally included to be representative of random access memory (e.g., static random access memory (SRAM), dynamic random access memory (DRAM), or Flash). The storage 530 is generally included to be representative of non-volatile memory, such as a hard disk drive, solid-state device (SSD), removable memory cards, optical storage, and/or flash memory devices. Additionally, the storage 530 can include storage area network (SAN) devices, the cloud, or other devices connected to the super learner manager 500 via the I/O device interface 510 or to a network 550 via the network interface 515.

In some embodiments, the memory 525 stores instructions 560. However, in various embodiments, the instructions 560 are stored partially in memory 525 and partially in storage 530, or they are stored entirely in memory 525 or entirely in storage 530, or they are accessed over a network 550 via the network interface 515.

Instructions 560 can be processor-executable instructions for performing any portion of, or all, of the method described in FIG. 4, and/or the functionality discussed in FIGS. 1-3.

In various embodiments, the I/O devices 512 include an interface capable of presenting information and receiving input. For example, I/O devices 512 can present information to a listener interacting with super learner manager 500 and receive input from the listener.

The super learner manager 500 is connected to the network 550 via the network interface 515. Network 550 can comprise a physical, wireless, cellular, or different network.

In some embodiments, the super learner manager 500 can be a multi-user mainframe computer system, a single-user system, or a server computer or similar device that has little or no direct user interface but receives requests from other computer systems (clients). Further, in some embodiments, the super learner manager 500 can be implemented as a desktop computer, portable computer, laptop or notebook computer, tablet computer, pocket computer, telephone, smartphone, network switches or routers, or any other appropriate type of electronic device.

It is noted that FIG. 5 is intended to depict the major representative components of an exemplary super learner manager 500. In some embodiments, however, individual components can have greater or lesser complexity than as represented in FIG. 5, components other than or in addition to those shown in FIG. 5 can be present, and the number, type, and configuration of such components can vary.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
   performing a batch of decentralized deep learning training for a machine learning model in coordination with one of a plurality of associated subsets of a local plurality of homogenous learners on a deep learning training compute node, and in coordination with a super plurality of super learners on a corresponding plurality of deep learning training compute nodes, wherein each of the super plurality of super learners is a parent to one of the plurality of associated subsets of the local plurality of homogenous learners, and wherein respective super learners are associated with respective subsets of the local plurality of homogenous learners; and
   exchanging communications with the super plurality of super learners in accordance with an asynchronous decentralized parallel stochastic gradient descent (ADPSGD) protocol, wherein the communications are associated with the batch of deep learning training.

2. The method of claim 1, wherein a local communication bandwidth between the local plurality of homogenous learners is greater than a super communication bandwidth between the super plurality of super learners.

3. The method of claim 1, wherein the local plurality of homogenous learners performs a local plurality of batches of deep learning training, and wherein the communications are associated with the local plurality of batches of deep learning training.

4. The method of claim 1, further comprising converging for the machine learning model based on the batch learning training and the communications.

5. The method of claim 1, further comprising performing a compression algorithm on the communications.

6. The method of claim 1, further comprising the local plurality of homogenous learners performing intra-server communication after randomly selected batches of the deep learning training.

7. The method of claim 6, wherein the intra-server communication is performed according to a synchronous stochastic gradient descent protocol.

8. A computer program product comprising program instructions stored on a computer readable storage medium, the program instructions executable by a processor to cause the processor to perform a method comprising:
   performing a batch of decentralized deep learning training for a machine learning model in coordination with one of a plurality of associated subsets of a local plurality of homogenous learners on a deep learning training compute node, and in coordination with a super plurality of super learners on a corresponding plurality of deep learning training compute nodes, wherein each of the super plurality of super learners is a parent to one of the plurality of associated subsets of the local plurality of homogenous learners, and wherein respective super learners are associated with respective subsets of the local plurality of homogenous learners; and
   exchanging communications with the super plurality of super learners in accordance with an asynchronous decentralized parallel stochastic gradient descent (ADPSGD) protocol, wherein the communications are associated with the batch of deep learning training.

9. The computer program product of claim 8, wherein a local communication bandwidth between the local plurality of homogenous learners is greater than a super communication bandwidth between the super plurality of super learners.

10. The computer program product of claim 8, wherein the local plurality of homogenous learners performs a local plurality of batches of deep learning training, and wherein the communications are associated with the local plurality of batches of deep learning training.

11. The computer program product of claim 8, the method further comprising converging for the machine learning model based on the batch learning training and the communications.

12. The computer program product of claim 8, the method further comprising performing a compression algorithm on the communications.

13. The computer program product of claim 8, the method further comprising the local plurality of homogenous learners performing intra-server communication after randomly selected batches of the deep learning training.

14. The computer program product of claim 13, wherein the intra-server communication is performed according to a synchronous stochastic gradient descent protocol.

15. A hierarchical system comprising:
a super plurality of super learners at a parent level of the hierarchical system; and
a local plurality of homogenous learners at a child level of the hierarchical system, wherein each of the super plurality of super learners is a parent to an associated subset of the local plurality of homogenous learners, and wherein respective super learners are associated with respective subsets of the local plurality of homogenous learners, and wherein each of the super plurality of learners comprises:
a computer processing circuit; and
a computer-readable storage medium storing instructions, which, when executed by the computer processing circuit, are configured to cause the computer processing circuit to perform a method comprising:
performing a batch of deep learning training for a machine learning model in coordination with the associated subset of the local plurality of homogenous learners on a deep learning training compute node, and in coordination with the super plurality of super learners on a corresponding plurality of deep learning training compute nodes; and
exchanging communications with the super plurality of super learners in accordance with an asynchronous decentralized parallel stochastic gradient descent (ADPSGD) protocol, wherein the communications are associated with the batch of deep learning training.

16. The system of claim 15, wherein a local communication bandwidth between the associated subset of the local plurality of homogenous learners is greater than a super communication bandwidth between the super plurality of super learners.

17. The system of claim 15, wherein the local plurality of homogenous learners performs a local plurality of batches of deep learning training, and wherein the communications are associated with the associated subset of the local plurality of batches of deep learning training.

18. The system of claim 15, the method further comprising converging for the machine learning model based on the batch learning training and the communications.

19. The system of claim 15, the method further comprising performing a compression algorithm on the communications.

20. The system of claim 15, the method further comprising the associated subset of the local plurality of homogenous learners performing intra-server communication after randomly selecting a plurality of batches of the deep learning training, wherein the intra-server communication is performed according to a synchronous stochastic gradient descent protocol.

* * * * *